Sept. 6, 1960 V. E. MATULAITIS ET AL 2,951,969
EDM PULSING CIRCUIT
Filed Dec. 12, 1957
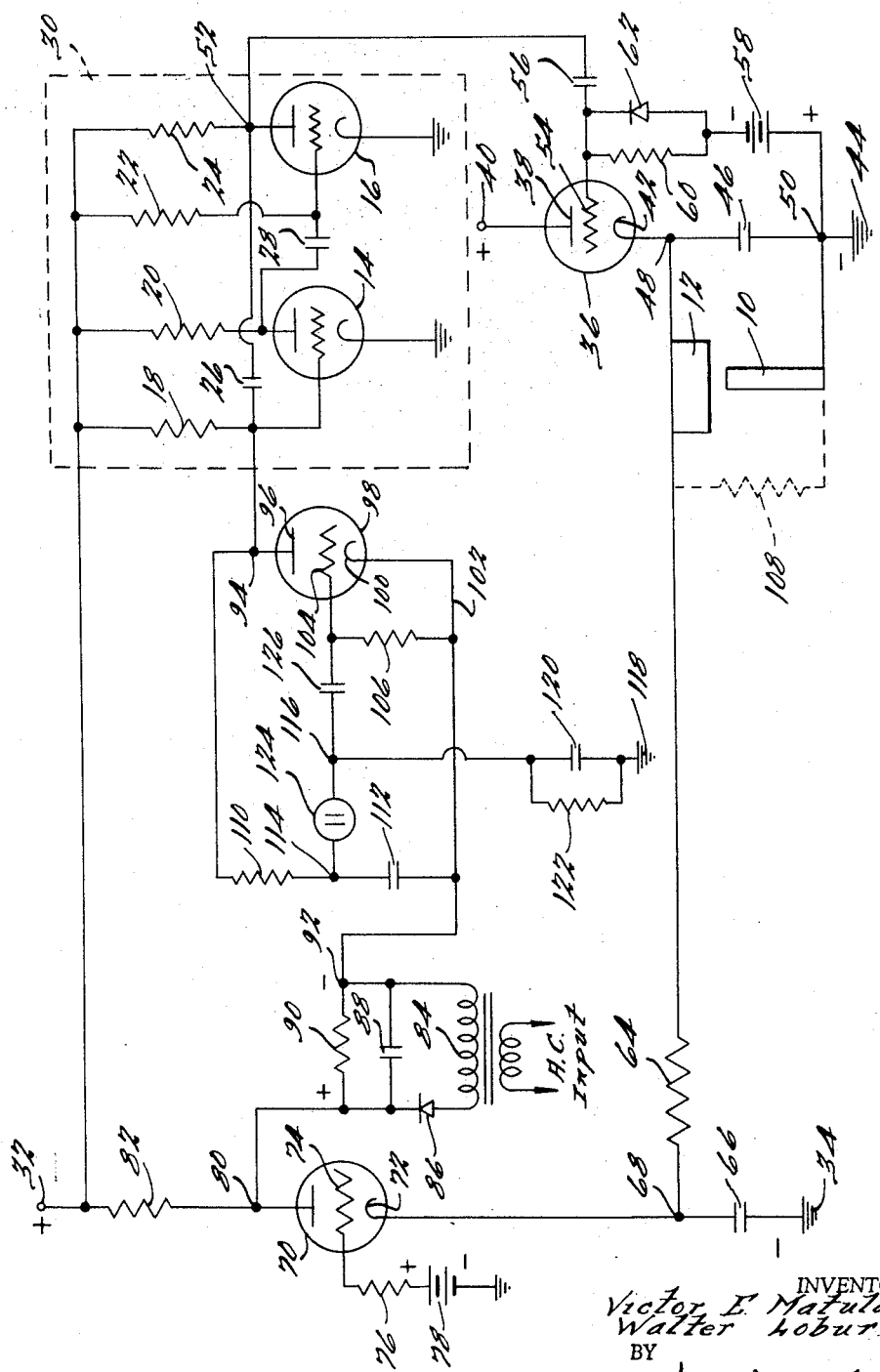
INVENTORS.
Victor E. Matulaitis
Walter Lobur
BY
M K Murphy
ATTORNEY.

United States Patent Office 2,951,969
Patented Sept. 6, 1960

2,951,969
EDM PULSING CIRCUIT

Victor E. Matulaitis, Franklin, and Walter Lobur, Clawson, Mich., assignors to Elox Corporation of Michigan, Royal Oak, Mich., a corporation of Michigan Filed Dec. 12, 1957, Ser. No. 702,283

11 Claims. (Cl. 315—163)

This invention relates to electrical-discharge-machining, sometimes referred to as EDM.

EDM as now practiced, contemplates almost completely automatic operation with automatic withdrawal and advancement of the machining electrode to clear short-circuits, permit flushing away of accumulated chips in the hole, break "bridges" caused by stringers, etc. In operations where blind slots of very narrow dimension are being machined, and similar operations, "bridging," accumulation of chips and short-circuits are frequent and considerable machining time is lost because the automatic control retracts and advances the electrode frequently in response to signals received from the power-pulse generating apparatus. Then, to, the power circuit is rendered less stable than desired and the quality of finish of the work suffers.

It is the primary object of my invention to provide an improved power pulsing circuit for EDM apparatus which is stable under all conditions of operation and which provides a reduction in time consumed on each job.

Another object is to materially improve the stability of the EDM circuit in instances where the nature of the machining operation makes possible the accumulation of chips in localized areas.

Still another object is to provide for production of periodic, short duration, heavy current pulses across the machining gap whenever a short-circuit exists across the gap and whenever an abnormally low impedance exists across the gap.

A further object is to minimize tendency of the electrode to withdraw or "back-up" from the work due to operation of the automatic feed control during adverse machining conditions.

Other objects and advantages will appear from the following specification which, taken in conjunction with the accompanying drawing, discloses a preferred form of the invention.

In the drawing, I have shown schematically an electrical-discharge-machining circuit embodying my invention.

In the description which follows, voltages or potential difference levels at the several points in the circuit at various times in the operating sequence will be referred to in the equivalent of gravitational heights or potentials as is generally used and understood in circuit descriptions.

Referring now to the drawing, it will be seen that I have shown schematically an electrode 10 disposed in spaced relationship to a workpiece 12. It will be understood that some means (not shown) is provided for maintaining continuous circulation of coolant through the gap between the electrode and workpiece during the machining operation, as is now common in the art. The workpiece is connected to the positive side of the power circuit, and the electrode is connected to the negative side which in this instance is ground.

A pair of triodes 14 and 16 are interconnected with resistors 18, 20, 22, 24, and with condensers 26, 28, in a simple multi-vibrator circuit which is indicated by the dotted line 30. This arrangement is more or less conventional and operates to create substantially rectangular voltage pulses with almost any desired "on-off" time ratio and frequency in accordance with proper adjustment of the parameters of the circuit, as is well understood in the art.

The multi-vibrator 30 obtains operating power from a D.C. power supply whose positive terminal is indicated by numeral 32 and negative or ground terminal by numeral 34.

The power for firing the gap comes from a bank of vacuum tubes represented by the tube 36. It will be understood that this bank may consist of a great number of tubes, sometimes several hundreds, in accordance with the nature of the machining operation being performed. The tube 36 (representing the entire bank) has its anode 38 connected at 40 to the positive side of a D.C. source and its cathode 42 to the workpiece 10. Terminals 32 and 40 may be the same or different power supplies depending upon the size and parameters of the apparatus. Similarly, the grounds 34 and 44 may be the same or different.

As stated, the workpiece 12 is connected at 48 to the cathode 42 of the tube 36, and the electrode 10 is connected at 50 to ground 44, a condenser 46 being preferably, but not necessarily, connected across the gap between the electrode and workpiece.

The output terminal 52 of the multi-vibrator or "pulser" 30 is connected to the grid 54 of tube 36 through a coupling condenser 56. The grid 54 is also connected to a source of bias voltage 58 through a resistor 60, the latter being shunted by a one-way current limiting device 62, such that the drive signal provided by the condenser 56 is "clamped" positive with respect to the bias voltage 58. The use of voltage clamps is well known in the electronic art and will not be elaborated upon, it being understood that the combination of condenser 56, grid leak resistor 60, and current limiter 62 (which may be a diode or the equivalent) functions to cause the drive signal to the tube bank to be always positive with respect to the bias source 82.

It should be mentioned at this point that while the pulser output is shown as directly coupled to the grids of the tube bank, any desired number of amplifiers or other circuit components might be provided and connected between the pulser 30 and the condenser 56 for the purpose of amplifying and/or "squaring" the pulser signal without affecting the inventive concept herein set forth.

The application of the pulser drive signal to the tube bank 36 causes the latter to act as a cathode follower and thus causes the bank to transmit intermittent power pulses which flow from the cathodes 42 across the gap between the workpiece 12 and electrode 10, or into condenser 46 if the gap be too long for a discharge to occur.

In the course of machining with this circuit, the gap will, on occasion, become partially or completely short circuited. When this occurs, it is desirable that the power be substantially reduced or shut off as rapidly as possible to prevent damage to the workpiece. One way of automatically accomplishing this is shown and described in my Patent Number 2,769,078, granted October 30, 1956. Another method will now be described which is more suited for use with the improved EDM circuit herein described and claimed.

A resistor 64 and a condenser 66 are connected in series across the gap between the electrode 10 and workpiece 12 in such manner that a "filtered" or substantially average value of gap voltage appears at point 68 in the circuit. A triode 70 has its cathode 72 connected to the point 68, so the cathode 72 is maintained at a voltage level equal to the average gap voltage during operation of the apparatus. The grid 74 of triode 70 is connected through a resistor 76 to a bias voltage 78 which acts to keep the grid 74 positive with respect to ground or electrode potential.

The value of the bias voltage 78 is determined by the characteristic of the tube 70 and normally runs from 9 to 15 volts. In any event, the value of this voltage must be such that when the gap becomes short circuited, or when the gap voltage falls to an average value of less than 10 volts, the tube 70 will conduct heavily. Furthermore, it is necessary that during normal operation of the apparatus with the average gap voltage in excess of 15 volts, the triode 70 will be substantially "cut-off" or non-conducting. Resistor 76 prevents excessive grid currents during the time the cathode 72 is effectively grounded as is the case when the gap is shorted.

During normal cutting, the voltage between points 32 and 34 is preferably 200 volts, and it will be apparent from the foregoing that the voltage at point 80 will be the same because tube 70 is non-conducting at this time. As such times when the gap is short circuited or the voltage thereof is less than 10 volts, the tube 70 is fully conducting and the voltage at point 80 will be approximately 30 volts.

Point 80 is connected to a source of floating bias voltage which comprises a transformer 84, rectifier 86, condenser 88 and load resistor 90. This floating bias, connected as shown, causes the voltage variations at point 80 to appear at a lower level at point 92. For example, if the output voltage of the floating bias appearing across resistor 90 is made 150 volts, the voltage variations at point 92 will swing through the range of plue 50 to minus 120 when the voltage at point 80 swings between plus 200 and plus 30.

It will be noted that the pulser grid leak resistors 18 and 22 are connected to the positive side 32 of the main supply, but with the circuit just described the voltage appearing at point 94 will be negative at all times. Point 94 is connected directly to the anode 96 of a triode tube 98; thus the anode voltage is likewise negative during normal operation of the pulser. The cathode 100 of tube 98 is connected by conductor 102 to the point 92, which during normal operation is at a potential of plus 50 volts; therefore, an inverse voltage is impressed on tube 98 (anode negative—cathode positive) and the tube can not conduct. The circuit between points 92 and 94 is, then, open.

It will be seen, as so far described, that a short circuit of the gap between electrode 10 and workpiece 12 (indicated by the broken line resistor 104) will cause tube 70 to become instantly conductive and conductor 102 will drop to a voltage of 120 volts. This will "pull down" the anode 96 of tube 98 to 120 minus volts, because the grid 104 of this tube is connected by grid leak resistor 106 to conductor 102, so the grid is at substantially the same voltage as cathode 100. The point 94 then will be at a potential of minus 120 volts, which voltage is sufficiently negative to render tube 14 of the pulser non-conducting. As long as tube 14 is cut off, the pulsing action of the tubes 14 and 16 is cut off and the drive signal on the grids 54 of the power tube bank disappears. Thus the gap ceases to fire because when the drive signal ceases, the negative bias voltage 58 acts through resistor 60 to cut off the bank.

This cut-off or "watch dog" circuit is extremely effective and will function instantly to cut off power from the gap not only when the gap is short circuited (as, for example, when the electrode 10 is in direct contact with the workpiece 12), but also when there is a partial short, or a decrease in gap impedance of predetermined magnitude (as indicated by the broken line resistor 108). Such a partial short may occur fairly frequently in EDM because of accumulations of chips or sludge in the machining gap area caused by temporary failure or inability of the coolant to remove the eroded material.

Likelihood of sludge accumulation increases with difficult machining operations. For example, when machining deep and intricate cavities in forging or molding dies, it is sometimes impossible to maintain at all times adequate flow of coolant. In these instances, the above described power cut-off circuit will function frequently to prevent damage to the workpiece and the electrode 10 will automatically retract from the workpiece 12 through action of the automatic feed control. An example of this type of automatic servo-feed control is fully described in McKechnie Patent No. 2,882,437, and reference is made thereto. It is deemed sufficient for the purposes herein to state that the automatic feed control functions to feed the electrode toward the workpiece and maintain optimum spacing with respect thereto during machining and, in response to cut-off of gap power, to automatically retract the electrode and to automatically advance it again to machining position upon restoration of gap power.

The characteristics of the automatic electrode feed are such that considerable time is required for its operation when the electrode movement is considerable, and this represents a waste of machining time in instances where gap short circuits are fairly frequent and where they may persist for several seconds. Obviously, if the accumulation of chips or sludge in the gap causing the short could be removed quickly and without attention on the part of the machine operator, the machining rate would be increased with consequent reduction in cost. It has been found that a substantial improvement in this respect is accomplished by causing a series of short duration bursts of power to the gap under these conditions.

Specifically, means is provided for causing the pulser 30 to fire the gap a number of times after the above described cut-off function has occurred for the purpose of blasting away the chip or sludge accumulation immediately that the electrode has started withdrawal. With this means, electrode retraction caused by a gap short circuit may be reduced to .010 to .100 inch from .500 to 2.00 inches or more which occurs frequently in ordinary EDM apparatus. Assuming that the multi-vibrator or pulser 30 is operating at some frequency between 15,000 and 500,000 cycles per second, application of some very small number of bursts, say two to ten bursts of high-frequency pulses per second, to the gap will in most instances blast away the sludge accumulation without heating the workpiece area detrimentally. This is accomplished as follows:

During normal machining, the instantaneous voltage at point 94 varies cyclically from zero to some peak negative voltage. The nature of this voltage variation is such that the average voltage at point 94 is approximately minus 30 volts. The point 94 is connected in series with a resistor 110 and a condenser 112, the latter being connected to conductor 102. This series connection acts as a filter such that the voltage at point 114 is substantially constant at a value equal to the average voltage at point 94, namely minus 30 volts. The value of resistor 110 is chosen sufficiently high, 10 megohms or more, such that there is no loading or interference with operation of the pulser 30. Point 114 in the circuit is connected through a gas filled neon lamp 124 with point 116. Point 116 is connected to ground 118 through a condenser 120 and to the grid 104 of tube 98 through a condenser 126. Condenser 120 is shunted by a short-circuiting resistor 122.

Under the normal machining conditions being considered, condenser 120 is substantially uncharged because of the shorting resistor 122; therefore, point 116 is at ground or zero potential. The gas filled lamp 124 functions as a limiting resistor in that it will pass no current until a selected minimum voltage is applied across it. Thereafter, it will pass substantial current at the initiating or a lower voltage. The lamp 124 is of readily obtainable commercial type and will pass current at an initiating voltage of 55 volts with a reduction to 45 volts required to extinguish the lamp.

It is clear then that since under normal machining, the voltage across lamp 124 is only 30 volts (the difference in voltage between points 114 and 116), the lamp will not pass current. It should be noted that, at this time, condenser 112 is charged at 80 volts because of its connection to point 114 (minus 30 volts) and conductor 102 (plus 50 volts), the condenser plate connected to point 114 being negative with respect to the plate connected to conductor 102.

When a short occurs in the gap (represented by resistor 108), conductor 102 will instantly assume a voltage of minus 120 volts. The charge on condenser 112 remains unchanged until lamp 124 "fires"; therefore, the potential of point 114 becomes minus 200 volts. There is then a voltage of 200 volts across the lamp which is more than sufficient to fire same. The lamp will conduct and becomes the equivalent of a low impedance 45 volt source in the circuit.

Condensers 112 and 120 will then function like a potentiometer and a rapid redistribution of charge takes place. Consideration of voltages around the loop with proper regard for polarities will show that the charge redistribution must account for a potential difference of 155 volts. If condensers 120 and 112 have capacities of .05 and .10 respectively, condenser 120 will acquire a charge of approximately 103 volts, and the potential of point 116 will become minus 103 volts. At the same time, the charge on condenser 112 will change by 52 volts reducing the initial 80 volts charge on this condenser to 28 volts, so that the potential at point 114 becomes, momentarily, 148 volts.

Lamp 124 extinguishes abruptly when the condenser charge redistribution is completed. Point 116 will not remain at minus 103 volts because the shunt resistor 122 around condenser 120, which is of 1 megohm value, tends to discharge the condenser. The charge on condenser 112 will not change appreciably while condenser 120 is discharging because the only path of current flow is through resistor 110 which is 10 megohms. It will be understood that very weak currents that may flow through resistor 110 may be neglected so far as the operation being described is concerned.

As condenser 120 discharges, the voltage at point 116 will become steadily less negative while that at point 114 remains substantially constant. Thus the voltage across lamp 124 will increase until the lamp again "breaks down" and a second and smaller redistribution of condenser charge will take place. A series of such charge redistributions will take place with the potential of point 114 becoming successively less negative until at the last discharge, point 114 will be at negative 55 volts (the ionization voltage of lamp 124) and the point 116 will be at zero or ground potential. Note that a complete reversal of charge cross condenser 112 takes place since the plate connected to point 114 is now positive with respect to the plate connected to conductor 102 which is now at negative 120 volts.

If the resistor 110 were not present in the circuit, a series of discharges through lamp 124 would take place of increasing frequency and rapid weakening. The presence of resistor 110 slows the action and provides a stable series of uniformly spaced flashes because, as the point 114 tends to become less negative following each condenser charge redistribution, there is an increasing current flow through the resistor 110 from the point 114 to the more negative anode 96 of tube 98.

During the action just described, the gradual discharge of condenser 120 through resistor 122 causes the voltage at point 116 to gradually go relatively positive, but when lamp 124 ionizes and "flashes," the accompanying condenser charge redistribution causes the voltage at 116 to drop abruptly to a more negative value.

Accordingly the result is that there is a series of current surges through lamp 124 which will be spaced initially at .05 to .10 second apart and may be stabilized at a time spacing of anything desired from .10 to 10 seconds.

Point 116 is connected to the grid 104 of tube 98 by a coupling condenser 126, and a grid leak resistor 106 is connected between the grid and conductor 102. Thus the "voltage swing" at point 116 is transferred to grid 104 and the grid is driven negative for a short period each time that lamp 124 flashes, the time constant characteristic of the network 126—106 being designed such that it is small compared to that of the networks 110—112 and 120—122 respectively.

Each time that tube 98 is cut off or rendered nonconducting, the pulser 30 immediately resumes its driving function and the tube bank 36 fires the gap between electrode 10 and workpiece 12. It will be readily seen that the duration and timing of the pulser operation during a short circuit condition may be fixed by appropriate adjustment of the network 126—106 to provide the desired characteristic.

While some specific values for circuit constants and voltages have been given by way of example, it will be understood that such will vary in individual instances depending upon the variations in parameters of commercially obtainable vacuum tubes, and determination of the correct values of these and other constants and voltages not given is well within the skill of the practitioner in the art.

While we have shown but one embodiment of the invention for illustrative purposes, it will be understood that it is not intended to limit the invention except as set forth in the appended claims.

We claim:

1. In an electrical discharge machining apparatus having an electrode tool adapted to be disposed in spaced relationship with a workpiece, a power unit for supplying intermittent voltage pulses across the gap between the electrode and workpiece, means operable automatically in response to predetermined decrease in gap impedance for cutting off said voltage pulses and for applying short, relatively widely spaced voltage pulses during the period of decreased impedance.

2. In an electrical discharge machining apparatus having an electrode tool disposed in gap relationship with a workpiece to be machined, a power unit for supplying to the gap periodic voltage pulses at relatively high-frequency, means operably associated with said power unit operable automatically in response to a decrease in impedance of said gap of predetermined value to cut off said periodic, high-frequency voltage pulses and apply to the gap a series of relatively widely spaced bursts of high frequency voltage pulses until the gap impedance returns to normal.

3. In an electrical discharge machining apparatus having an electrode tool disposed in gap relationship with a workpiece to be machined, a power unit for supplying to the gap periodic voltage pulses at relatively high-frequency, means operably associated with said power unit operable automatically in response to a decrease in impedance of said gap of predetermined value to cut off said periodic, high-frequency voltage pulses and apply to the gap a series of spaced bursts of high frequency voltage pulses until the gap impedance returns to normal, then to restore normal periodic high-frequency power supply to the gap.

4. In an electrical discharge machining apparatus, a power unit for supplying to the machining gap periodic power pulses at relatively high-frequency, means operable automatically in response to a gap short circuit for cutting off said periodic high-frequency pulses, and means operable in response to cutting off of said periodic high-frequency pulses to supply to the gap bursts of power pulses at relatively low-frequency.

5. In an electrical discharge machining apparatus, a power unit for supplying to the machining gap periodic power pulses at relatively high-frequency, means operable automatically in response to a gap short circuit for cutting off said high-frequency pulses, means operable in response to cutting off of said high-frequency pulses to supply relatively low-frequency bursts of high-frequency pulses to the gap, and means operable in response to restoration of normal gap impedance to restore the normal high-frequency power supply.

6. In the electrical discharge machining apparatus, an electronic tube bank for applying intermittent power pulses to the machining gap at relatively high frequency, a multi-vibrator for controlling operation of said tube bank, a watchdog network operable in response to predetermined decrease in gap impedance for cutting off the multi-vibrator, and a low-frequency pulsing network operably connected to said multi-vibrator for causing intermittent operation of the latter during periods of low gap impedance.

7. In an electrical discharge machining apparatus, power supply means connected across the working gap operable to cause intermittent discharge across the gap at relatively high frequency, means operable automatically in response to a decrease in gap impedance below a predetermined minimum for cutting off said high frequency intermittent discharge, means operably connected to said power supply and operable in response to operation of said cut-off means for causing intermittent discharge across the gap at relatively low frequency.

8. In an electrical discharge machining apparatus, power supply means connected across the working gap operable to cause intermittent discharge across the gap at relatively high frequency, means operable automatically in response to a decrease in gap impedance below a predetermined minimum for cutting off said high frequency intermittent discharge, means operably connected to said power supply and operable in response to operation of said cut-off means for causing intermittent discharge across the gap at relatively low frequency, and for restoring operation of said high frequency discharge in response to restoration of normal gap impedance.

9. The combination set forth in claim 7 wherein said last means comprises an electron tube network.

10. In an electrical discharge machining apparatus, a power supply connected across the working gap, a multivibrator operably connected to said power supply for causing the power supply to deliver power pulses at fixed frequency, a network connected to the gap and to the multivibrator operable to cut off the multivibrator in response to decrease in gap impedance below predetermined normal, and to restore operation of the multivibrator in response to restoration of normal gap impedance, and a second network connected to the multivibrator and to the first network operable to cause said multivibrator to operate for short widely spaced intervals during periods of abnormally low gap impedance.

11. In an electrical discharge machining apparatus having an electrode and means for disposing said electrode in predetermined gap relation with a workpiece to be machined, power supply means connected across the gap operable to cause intermittent discharge across the gap at relatively high frequency, means operable automatically in response to a decrease in gap impedance below a predetermined minimum for cutting off said high frequency intermittent discharge, means operably connected to said power supply and operable in response to operation of said cut-off means for causing intermittent bursts of power in the electrode-workpiece circuit at relatively low frequency.

References Cited in the file of this patent

UNITED STATES PATENTS

| | | |
|---|---|---|
| 2,346,975 | Laboulais | Apr. 18, 1944 |
| 2,794,152 | Matulaitis | May 28, 1957 |
| 2,804,575 | Matulaitis | Aug. 27, 1957 |
| 2,871,410 | Matulaitis | Jan. 27, 1959 |